MULTIPLE STATION ACCESS REPERTORY DIALING SYSTEM

Filed March 25, 1964 4 Sheets-Sheet 1

INVENTOR
R. TRUBY
BY D. E. Snedeker
ATTORNEY

June 13, 1967 R. TRUBY 3,325,602

MULTIPLE STATION ACCESS REPERTORY DIALING SYSTEM

Filed March 25, 1964 4 Sheets-Sheet 3

United States Patent Office 3,325,602

Patented June 13, 1967

3,325,602

MULTIPLE STATION ACCESS REPERTORY DIALING SYSTEM

Ralph Truby, Rumson, N.J., assignor to Bell Telephone Laboratories, Incorporated, New York, N.Y., a corporation of New York Filed Mar. 25, 1964, Ser. No. 354,550
10 Claims. (Cl. 179—18)

ABSTRACT OF THE DISCLOSURE

A plurality of subscriber stations are concentrated into common repertory dialing facilities on a shared use basis through transistor preference lockout circuitry. Lockout circuitry is also provided to prevent a single station from monopolizing use of the repertory dialing facilities. One of the subscriber stations is equipped with a record key and can change the telephone numbers in the repertory.

Figure 1:
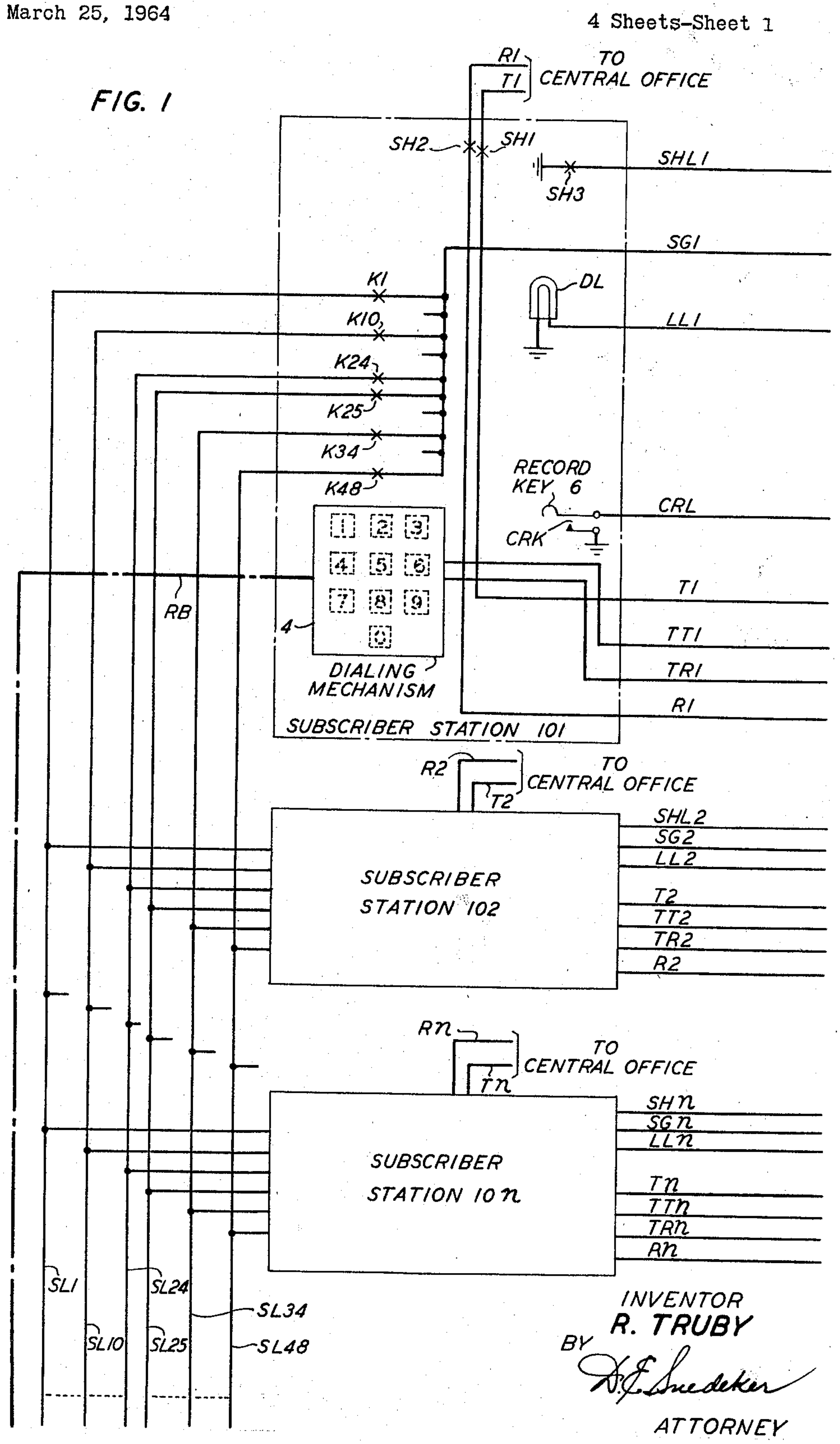
Figure 2:
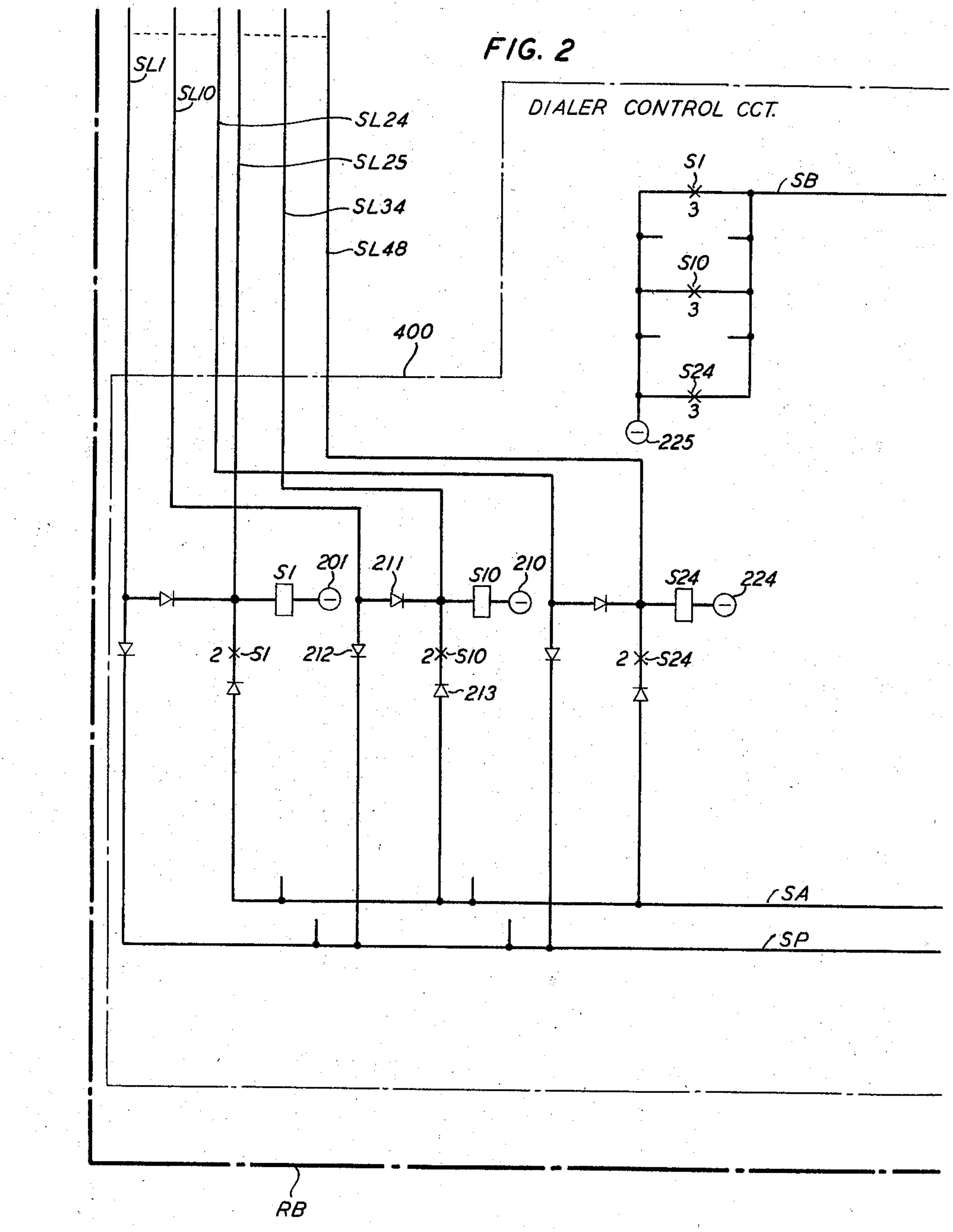

This invention relates to automatic telephone systems and more particularly to arrangements for facilitating the initiation of calls from subscriber stations in such systems. A broad general object of this invention relates to the provision of an arrangement independent of the central office equipment for concentrating a plurality of subscriber stations into common repertory dialing equipment on a shared-use basis.

It has been recognized that a large portion of the calls initiated by many individual subscriber stations are made to only a limited number of called stations. This is particularly true where the subscriber station is within a business or commercial environment. Although the speed with which dialing may be effected has been increased considerably through improvements in the telephone plant and through improved signaling techniques, the need exists for equipment which will permit even faster initiation of calls. At the same time, particularly with the advent of direct distance dialing and the consequent increase in the number of digits which must be dialed to reach a distant station, the concomitant need for more reliable and acurate dialing equipment with a minimum requirement for manual manipulation by the subscriber has been recognized. Considerable interest has been thus engendered toward repertory dialing arrangements as a means for achieving these results with respect to frequently called telephone numbers.

Repertory dialing basically encompasses the use of a memory in which is stored a plurality of telephone numbers determined by the individual subscriber. A call is initiated by the subscriber selecting the portion of the memory in which the desired telephone number is stored and effecting readout of the number to the central office equipment. Provision of telephone number information to the central office equipment to initiate a call is thus effected by the operation of one or more keys, for example, instead of the usual subscriber manipulation required for each digit of the telephone number. In this manner the time during which the subscriber is active in initiating a call, the amount of manual manipulation required, and the chance for dialing error are all greatly reduced, and the speed with which dialing of the number is performed by the repertory dialing arrangement is limited only by the characteristics of the equipment.

Various types of repertory dialing arrangements are known in the telephone art, some of which employ an individual repertory memory at each subscriber station and others of which employ repertory memory located at the central office. One example of a repertory dialing arrangement having memory and associated apparatus located at the subscriber's station is disclosed in A. E.

Johanson Patent 2,953,647, issued Sept. 20, 1960. An example of a repertory dialing arrangement employing a central office memory is disclosed in W. A. Malthaner–H. E. Vaughan Patent 2,951,908, issued Sept. 6, 1960. Though satisfactory in most respects, both of the above types of repertory dialing arrangements exhibit certain undesirable deficiencies. The individual station repertory dialing arrangement, though independent of the central office equipment, necessitates the placement of additional and relatively expensive equipment at each subscriber's premises. The use of central office repertory memory, on the other hand, usually requires considerable modification of existing central office equipment. Advantageously, the provision of repertory dialing service should require little or no additional equipment located at the subscriber's premises and should require a minimum of modification of existing station equipment. Moreover, repertory dialing advantageously should be independent of central office equipment and should require a minimum of equipment on a per station basis.

Accordingly, it is an object of this invention to provida a simple, compact and economical arrangement for interconnecting a plurality of subscribers with common repertory dialing equipment independent of the central office.

A further object of this invention is to provide repertory dialing service to a plurality of subscribers with a minimum of station equipment modification and with no additional connections between the station equipment and the central office equipment.

It is another object of this invention to provide repertory dialing service to a plurality of subscribers independent of the central office equipment and with a minimum of equipment required for each subscriber station.

The above and other objects are attained in an illustrative embodiment of the present invention wherein a simple and economical arrangement is provided for concentrating a plurality of subscriber stations into a single repertory dialer on a shared-use basis. Each of the subscriber stations is provided with a plurality of number selection keys individually associated with respective memory locations in the repertory dialer, each memory location storing an individual telephone number. Depending upon the number of keys at a subscriber station, each station is provided with access to all of the repertory memory locations or to only a respective portion thereof, as desired. Further, the capability for changing telephone numbers in the memory locations is provided to one or more of the subscriber stations. All that need be done at an individual subscriber station to gain access to the dialer and to automatically dial a telephone number stored in one of the memory locations is to depress momentarily the individual key associated with the memory location in which the number is stored. Similarly, access to the dialer for the purpose of changing a telephone number in the repertory is gained by depressing momentarily the individual key associated with the memory slot in which the number is to be changed and dialing the new number while maintaining a record key operated.

In accordance with one aspect of the invention, the subscriber stations are interconnected via a simple, compact and economical arrangement for marking a station seizing the repertory dialer and for preventing simultaneous seizure by two or more stations. Upon completed dialing of a number by the dialer, the common equipment is automatically released for use by another station regardless of whether the first station maintains a number selection key operated or not. Thus, the time required for the common equipment to initiate a call for one station and to release for use by another station is minimized; that is, the time therefor is determined entirely by the equipment characteristics and not in any way by the speed with which the number selection key is operated and released at the subscriber station. If the number selection key is maintained operated upon release of the dialer, the lockout arrangement is responsive thereto to lock out the first station until the key is released and to permit access to the dialer by the other subscriber stations. This advantageously prevents any one of the stations from continuously dialing a number by holding a number selection key operated, thus precluding the one station from monopolizing the dialer and depriving the other stations access thereto.

One feature of this invention, therefore, relates to an arrangement for concentrating a plurality of subscriber stations into a single repertory dialer on a shared-use basis independent of the central office equipment.

A further feature of this invention resides in circuitry for preventing one of a plurality of subscriber stations from monopolizing use of a common repertory dialer.

In accordance with another feature of this invention, a station concentrator includes circuitry operable incident to the seizure of common equipment by one of a plurality of stations for locking out the other stations and operable upon completed operation of the common equipment to lock out the one station and to permit seizure of the common equipment by the other stations.

Figure 5:
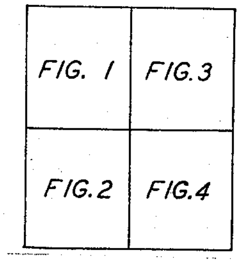

The foregoing and other objects and features of the invention may be fully apprehended upon consideration of the following detailed description and the accompanying drawings, in which:

FIGS. 1 through 4 show a specific illustrative embodiment of a concentrated repertory dialing system in accordance with the principles of the present invention, and FIG. 5 shows the arrangement of FIGS. 1 through 4.

In the specific illustrative embodiment shown in FIGS. 1 through 4, when arranged in accordance with FIG. 5, a plurality of subscriber stations 101 through 10*n* are concentrated via respective station control circuits 301 through 30*n* and dialer control circuit 400 into repertory dialer 450 on a shared-use basis. Repertory dialer 450 is assumed, for the purpose of facilitating description of the present invention, to be substantially similar to the repertory dialer disclosed in copending patent application Ser. No. 291,485, filed on June 28, 1963, by W. J. Brown, R. A. Miller, and H. O. Sautter, now Patent 3,280,269, issued October 18, 1966, and consequently it need not be described in detail herein. Briefly, however, repertory dialer 450 comprises a dialing circuit, a magnetic drum storage register and a motorized system for rotatably driving the drum. The drum has two adjacent information channels, each with its own magnetic transducer circuitry, the individual channels each having a capacity, for example, of twenty-four memory locations in which telephone numbers may be stored.

As will be described in greater detail below, when dialer 450 is idle and a bid therefor is made by one of subscriber stations 101 through 10*n*, dialer control circuit 400 seizes and initiates operation of dialer 450. One of the two channels is selected and the transducer circuitry associated therewith is energized in accordance with the presence or absence of a ground signal on lead RL from control circuit 400. The ground signal is present on lead RL to indicate that the selected memory location is in the second channel of the drum only when relay SC in dialer control circuit 400 is in the operated condition, the unoperated condition of relay SC indicating that the selected memory location is in the first information channel. The motorized system in dialer 450 is energized by a ground signal extended from control circuit 400 on lead ST and operates to rotate the drum to the selected one of the twenty-four memory locations thereon corresponding to the individual one of leads C1 through C24 marked by the subscriber station. In this manner, one of the forty-eight memory locations on the drum is selected under control of the subscriber station, and dialer 450 is conditioned by control circuit 400 over leads CR1 and CR2 either for storing a telephone number in the selected memory location or for automatically dialing a number previously stored in the selected memory location.

Subscriber stations 101 through 10*n* advantageously comprise standard key telephone sets of conventional design and thus, for the purposes of clarity, only so much of the circuitry thereof as is deemed necessary to a complete understanding of the present invention is shown in the drawing. Contacts K1 through K48 are individually operated by corresponding non-locking number selection keys (not shown), each of which is associated with a respective memory location in repertory dialer 450. More particularly, contacts K1 through K48 are connected via leads SL1 through SL48, respectively, in pairs to individual ones of selecting relays S1 through S24 in control circuit 400. Energization of one of relays S1 through S24 marks the corresponding one of leads C1 through C24 to dialer 450. Leads SL1 through SL24 are also connected in common to lead SP to provide an indication to dialer 450 as to which of the two information channels on the drum the selected memory location is in. It is assumed herein that the number selection keys which operate contacts K1 through K24 correspond to memory locations in a first channel of the drum and that the keys which operate contacts K25 through K48 correspond to memory locations in the second channel of the drum. As will be explained in detail below, assuming dialer 450 to be idle, all that need be done to automatically dial a telephone number stored in one of the memory locations is to depress momentarily the particular one of the number selection keys associated therewith. Dialer lamp DL is lighted at the subscriber station to indicate seizure of dialer 450 by that station. Although each of subscriber stations 101 through 10*n* in the illustrative embodiment in the drawing is provided with forty-eight number selection keys, and thus with access to each of the memory locations in dialer 450, it is apparent that one or more of the stations can be provided with access to only particular ones of the memory locations as desired.

Subscriber station 101 is provided with the capability of changing telephone numbers stored in repertory dialer 450 through the connection of contact CRK of record key 6 to dialer control circuit 400 over lead CRL. Individual ones of subscriber stations 102 through 10*n* can be provided with this capability in a similar manner through the connection of a record key contact thereat to lead CRL. As will be explained below, all that need be done to store a number in one of the memory locations in dialer 450 is to depress initially both the particular number selection key associated with that memory location and record key 6 and, while maintaining record key 6 depressed, to dail via dialing mechanism 4 the telephone number which is to be stored in the selected memory location. The dialed number is communicated to repertory dialer 450 for storage over record bus RB. Dialing mechanism 4 is also employed at subscriber station 101 when it is desired to manually dial a telephone number in the conventional manner to transmit the number to the central office over tip and ring conductors T1 and R1. One example of a dialing mechanism which may be employed advantageously herein is disclosed in copending patent application Ser. No. 860,549, filed on Dec. 18, 1959, by C. E. Mitchell, R. E. Prescott, L. Schenker, and D. G. Tweed, now Patent 3,109,071, issued Oct. 29, 1963.

Figure 3:
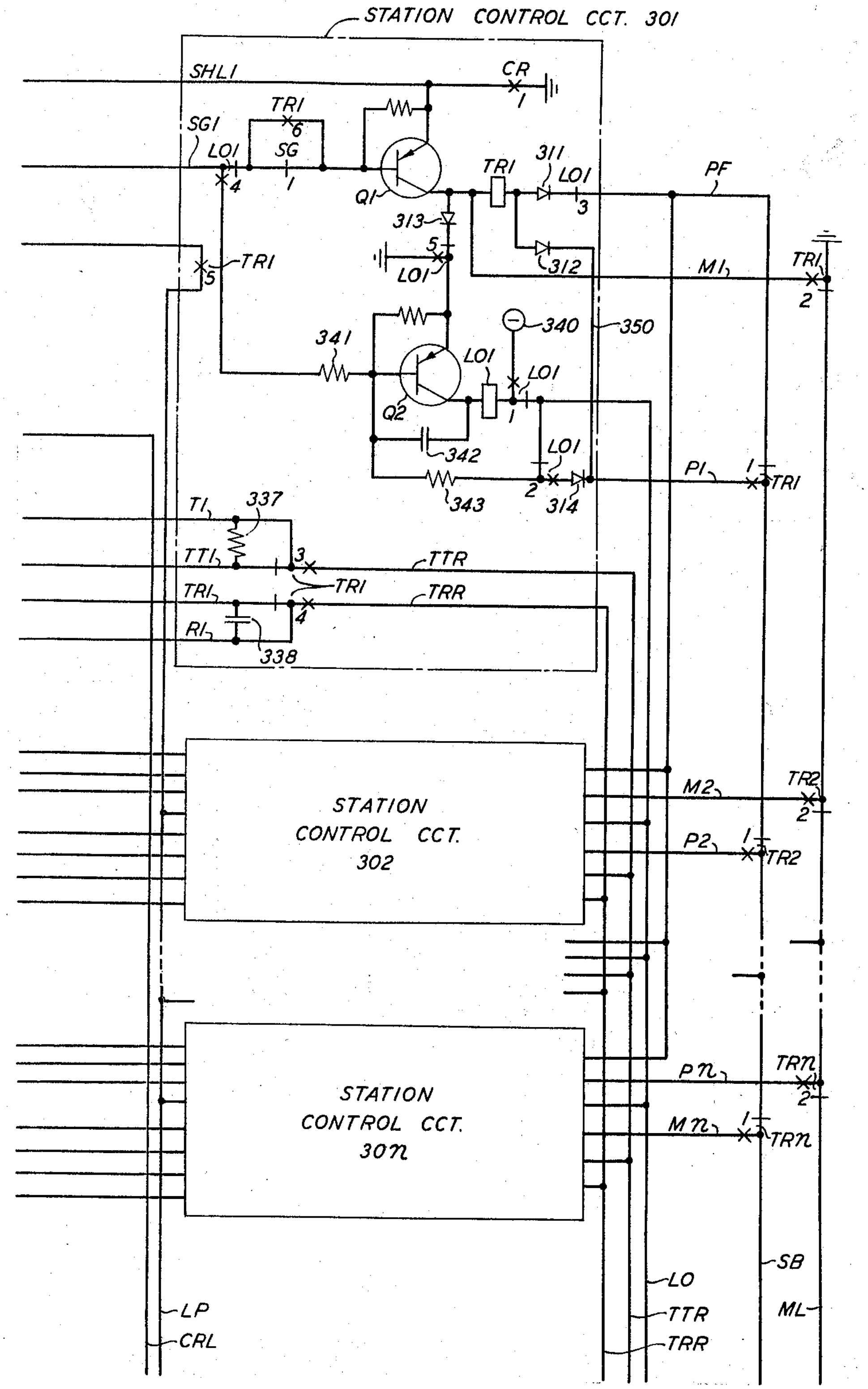
Figure 4:
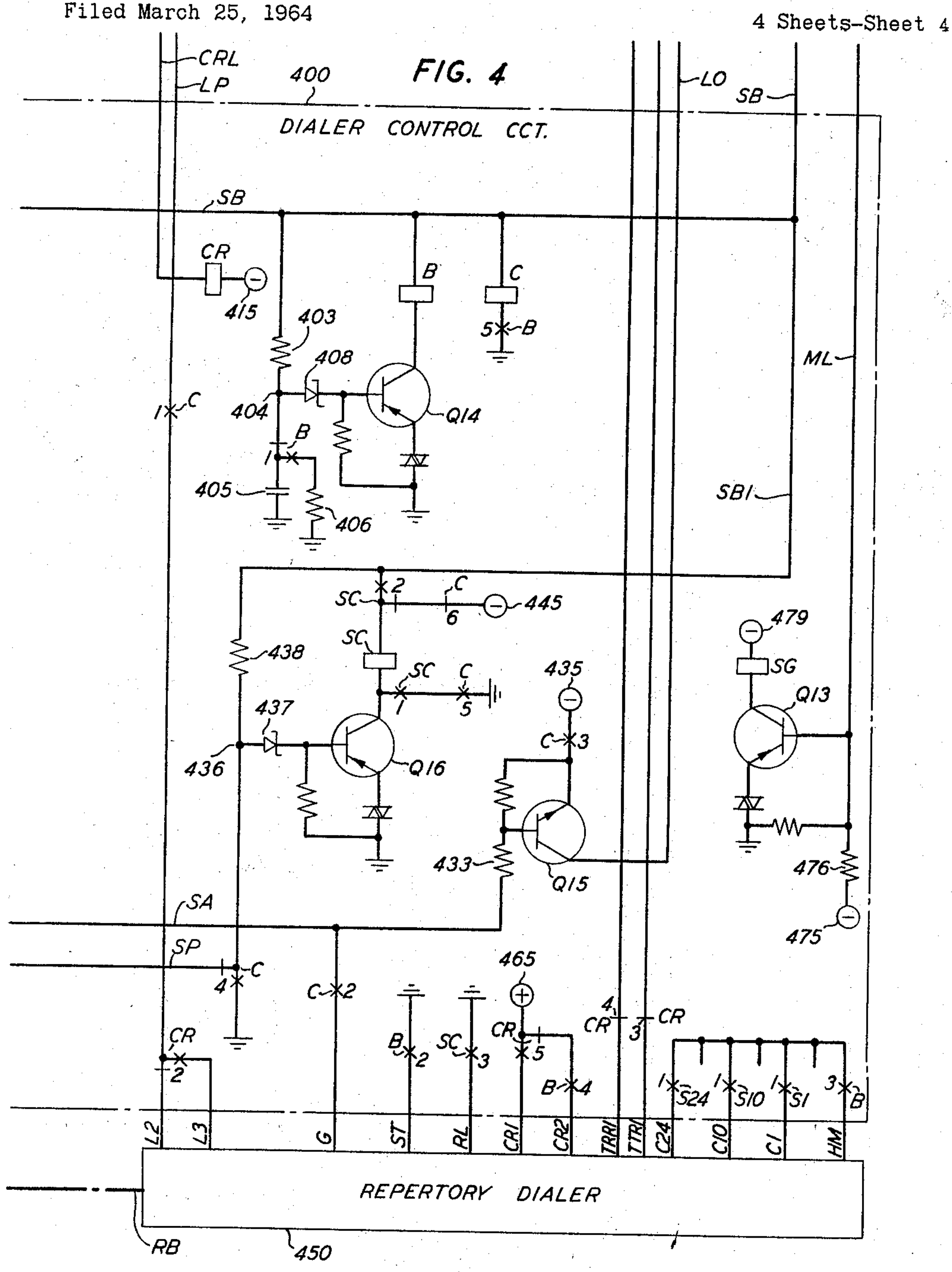

Subscriber stations 101 through 10*n* are interconnected by an arrangement shown in FIG. 3 for marking a station seizing repertory dialer 450 and for preventing simultaneous seizure by two or more of stations 101 through 10*n*. Individual to each stations 101 through 10*n* is a respective one of station control circuits 301 through 30*n*, each comprising a pair of transistors and a pair of relays, such as transistors Q1 and Q2 and relays TR1 and LO1 in station control circuit 301. Station control circuits 302 through **30*n*** thus each comprise a respective corresponding pair of relays (not shown) TR2 and LO2 through TR*n* and LO*n*. Relays TR1 through TR*n* operate individually to mark the seizure of dialer 450 by the corresponding one of stations 101 through **10*n* and to cut through the subscriber station tip and ring conductors, such as tip and ring conductors T1 and R1 for station 101, to dialer 450**. The operate path for each of relays TR1 through TR*n* is connected in common via lead PF through a preference lockout chain of transfer contacts of relays TR1 through TR*n* and over lead SB to dialer control circuit 400, thereby preventing simultaneous seizure of dialer 450 by two or more stations. A second chain of transfer contacts of relays TR1 through TR*n* functions via relay SG in dialer control circuit 400 to break the connection between all but the marked one of stations 101 through **10*n* and the corresponding one of station control circuits 301 through 30*n***.

After seizure of dialer 450 by one of stations 101 through **10*n***, the corresponding one of relays LO1 through LO*n* functions to provide automatic release of dialer 450 upon completed dialing of the selected number, regardless of whether the station still has the number selection key depressed or not. Relays LO1 through LO*n* further function, if the number selection key is maintained depresssed by the one station upon release of dialer 450, to lockout that station until the key is released. This advantageously minimizes the time during which dialer 450 is seized by a station to dial a number, and it prevents any one station from depriving the other stations access to dialer 450, either intentionally or through equipment malfunction.

A detailed description of the operation of the illustrative embodiment of the present invention shown in the drawing will now be considered.

Assume that subscriber station 101 is off-hook preparatory to initiating an outgoing call. Switchhook contacts SH1, SH2 and SH3 are actuated by the off-hook condition, switchhook contacts SH1 and SH2 operating to complete a path between the conventional station equipment, including dialing mechanism 4, and tip and ring conductors T1 and R1 to the central office. This path is traced via leads TT1 and TR1 through the break portions of transfer contacts 3 and 4 of relay TR1 to tip and ring conductors T1 and R1. At this time dialing mechanism 4 can be operated in the normal manner to dial the telephone number manually to initiate the call. However, it will be assumed for the purpose of illustration that the telephone number to be dialed is stored in the memory location in repertory dialer 450 corresponding to the number selection key at station 101 which actuates contact K10. Accordingly, all that need be done to dial the call automatically is to depress momentarily the particular number selection key actuating contact K10.

Actuation of contact K10 completes a path to energize selecting relay S10 in dialer control circuit 400. This path may be traced from source 210 through the winding of relay S10, diode 211, over lead SL10, through operated contact K10, lead SG1, the break portion of transfer contact 4 of relay LO1, break contact 1 of relay SG, the base-to-emitted circuit of transistor Q1, lead SHL1 and operated switchhook contact SH3 to ground. The ground potential thus extended over this path on lead SL10 energizes relay S10 and is also directed through diode 212, over lead SP, through the break portion of transfer contact 4 of relay C to point 436, which is connected through breakdown diode 437 to the base electrode of transistor Q16. Ground potential applied to point 436 maintains transistor Q16 in a nonconducting state, and thus relay SC in the unoperated condition, which it will be recalled indicates that the selected memory location is in the first of the two information channels in repertory dialer 450. This indication is extended to dialer 450 via the absence of a ground signal over lead RL, inasmuch as make contact 3 of relay SC remains unoperated. Accordingly, the magnetic transducer circuitry for the first channel is conditioned to be energized when operation of repertory dialer 450 is initiated.

When relay S10 is energized, make contact 1 thereof operates to mark lead C10 to repertory dialer 450 to indicate the memory location in the first channel of the drum wherein the telephone number to be automatically dialed is stored. This prepares a path between lead C10 and lead HM which is completed when relay B is energized to operate its make contact 3. A holding ground path is prepared for relay S10 via operated make contact 2 thereof through diode 213, over lead SA, through make contact 2 of relay C and over lead G to dialer 450. This path is not completed, however, until relay C operates and dialer 450 extends ground on lead G. The latter occurs when dialer 450 is seized and operation thereof is initiated, as will be explained below. Make contact 3 of relay S10 operates to connect source 225 to lead SB and thus through the break portions of transfer contacts 1 of each of relays TR1 through TR*n*, over lead PF, through break contact 3 of relay LO1, diode 311 and the winding of relay TR1 to the collector electrode of transistor Q1. It will be recalled that ground potential is extended to the emitter electrode of transistor Q1 via lead SHL1, and that source 210 is connected to the base electrode of transistor Q1 over lead SG1. Transistor Q1 is thus switched to a conducting state and relay TR1 is energized in the above-traced path to mark seizure of dialer 450 by subscriber station 101.

The operation of relay TR1, via its transfer contact 1, breaks the operate path between source 225 and lead PF to the TR relays in station control circuits 302 through **30*n*, thereby preventing any other of stations 102 through 10*n* from seizing dialer 450 until relay TR1 is released. The make portion of transfer contact 1 of relay TR1 extends source 225 on lead SB therethrough over lead P1 and lead 350 through diode 312 to the winding of relay TR1 to maintain relay TR1 energized. At the same time transfer contact 2 of relay TR1, via the make portion thereof, operates to complete a locking ground path for relay TR1 therethrough over lead M1. The break portion of transfer contact 2 of relay TR1 operates to remove the ground on lead ML to the base electrode of transistor Q13 in dialer control circuit 400. Source 475 is thus extended via resistor 476 to the base electrode of transistor Q13, switching transistor Q13 to a conducting state to complete an obvious path from source 479 through the winding of relay SG to ground. Relay SG is energized in this path and operates a break contact in the connection between the number selection key contacts in subscriber stations 101 through 10*n* and respective transistors Q1 in corresponding station control circuits 301 through 30*n*, such as break contact 1 of relay SG in station control circuit 301. This provides a break in the operate path for transistors Q1 in each of station control circuits 302 through 30*n*, providing additional protection against one of these stations operating one of relays S1 through S24 or gaining access to dialer 450 before it has completed the dialing operation for subscriber station 101. The connection over lead SG1 from station 101 to the base electrode of transistor Q1 in control circuit 301 is maintained, after operation of break contact 1 of relay SG, by the parallel path completed through operated make contact 6** of relay TR1.

Transfer contacts 3 and 4 of relay TR1 operate to transfer tip and ring conductors T1 and R1 from manual dialing mechanism 4 at station 101 to repertory dialer 450 over leads TTR and TRR. Resistor 337 and capacitor 338 provide sidetone effects over leads TT1 and TR1 to the receiver circuitry (not shown) at station 101 during dialing by repertory dialer 450. Operation of contact 5 of relay TR1 prepares a path for lighting lamp DL over leds LL1 and LP through contact 1 of relay C and the break portion of transfer contact 2 of relay CR over lead L2 to dialer 450. When operation of dialer 450 is initiated and relay C is energized, battery is connected to lead L2 to complete this path.

Source 225, connected to lead SB upon operation of make contact 3 of relay S10, is extended through resistor 403, point 404, the break portion of transfer contact 1 of relay B, and capacitor 405 to ground. Capacitor 405 charges in this path, causing the potential at point 404 to increase from ground toward the potential on lead SB. When the potential at point 404 reaches a level sufficient to effect the breakdown of breakdown diode 408, a path is completed therethrough to the base electrode of transistor Q14. The potential on lead SB is extended through the winding of relay B to the collector electrode of transistor Q14, the emitter electrode of which is connected to ground. Accordingly, transistor Q14 is placed in a conducting state, operating relay B in the above-traced path.

Transfer contact 1 of relay B operates to connect capacitor 405 through resistor 406 to ground, thereby discharging capacitor 405. The circuit including resistor 403, capacitor 405 and breakdown diode 408 is provided to delay the operation of relay B for a predetermined interval of time sufficient to insure that repertory dialer 450 has reset from operation with respect to a prior call. For example, in the repertory dialer disclosed in the above Brown-Miller-Sautter patent application, a period of time on the order of 170 milliseconds is required between calls to allow the mechanical equipment in the dialer to reset.

Make contact 2 of relay B operates to extend ground on lead ST to initiate operation of repertory dialer 450, the motorized driving system thus starting rotation of the drum storage register. Responsive thereto, dialer 450 places ground potential on lead G and battery on lead L2 to dialer control circuit 400. Operation of make contact 3 of relay B completes the connection of lead HM through operated make contact 1 of relay S10 over lead C10 to dialer 450, indicating to dialer 450 the selected memory location wherein the number to be dialed automatically is stored. The magnetic transducer circuitry adjacent the first information channel on the drum is conditioned, it will be recalled, by the absence of ground potential on lead RL. Source 465 extended over lead CR2 to dialer 450 through the break portion of transfer contact 5 of relay CR and operated make contact 4 of relay B conditions dialer 450 to read out the telephone number stored in the selected memory location.

Relay C is energized over an obvious path completed from lead SB through operated make contact 5 of relay B, make contact 1 of relay C extending the battery on lead L2 therethrough over lead LP to light lamp DL at station 101. Contact 2 of relay C operates to extend the ground on lead G therethrough to lead SA, and thus to complete the locking ground path for relay S10 through diode 213 and operated make contact 2 of relay S10. Operation of contact 3 of relay C completes a path from source 435 through the emitter to base circuit of transistor Q15 and through resistor 433 to ground potential on lead SA. Transistor Q15 is thus placed in a conducting state to complete the operating path for relay LO1 in station control circuit 301. This path may be traced from source 435 through operated make contact 3 of relay C, transistor Q15, over lead LO, through the break portion of transfer contact 1 of relay LO1, the winding of relay LO1, transistor Q2, the break portion of transfer contact 5 of relay LO1, diode 313, over lead M1, and through the make portion of operated transfer contact 2 of relay TR1 to ground. Transistor Q2 is in the conducting state in this path inasmuch as the negative potential from source 435 on lead LO is also directed through the break portion of transfer contact 2 of relay LO1 and resistor 343 to the base electrode of transistor Q2.

Since the selected memory location in dialer 450 is assumed to be in the first information channel, operation of contacts 4, 5 and 6 of relay C are of no effect on the operation of the system being presently described, except that transfer contact 4 of relay C operates to transfer the base electrode of transistor Q16 from the ground on lead SP to a direct ground connection and break contact 6 of relay C opens the connection between relay SC and source 445. Thus the ground potential applied through the break portion of operated transfer contact 4 of relay C to the base electrode of transistor Q16 continues after release of contact K10 in station 101, thereby assuring that transistor Q16 is maintained in a nonconducting state and that relay SC is not energized while dialer 450 is dialing the present call.

Dialer 450 proceeds to dial automatically the telephone number stored in the memory location therein corresponding to the number selection key depressed at subscriber station 101. It may be noted that the number selection key need not be maintained depressed during the operation of dialer 450, but may be released advantageously upon seizure of dialer 450 by station 101 as indicated by the lighting of lamp DL. The number dialed by dialer 450 is communicated to the central office equipment over leads TTR1 and TRR1, through break contacts 3 and 4 of relay CR, over leads TTR and TRR, through the make portions of operated transfer contacts 3 and 4 of relay TR1 and over tip and ring conductors T1 and R1. An indication of dialing is provided to station 101 via sidetone effects through resistor 337 to lead TT1 and through capacitor 338 to lead TR1.

During the operation of dialer 450, relay LO1 in station control circuit 301 is energized in the manner described above and operates in accordance with an important aspect of the present invention to release dialer 450 from further control by the number selection keys at station 101 after operation of dialer 450 has been initiated. Further, when dialer 450 completes dialing the call for station 101 it automatically releases to serve another call, regardless of whether the number selection key at station 101 is maintained depressed or not. More particularly, transfer contact 1 of relay LO1 operates to transfer holding battery for relay LO1 from lead LO to source 340, and transfer contact 2 of relay LO1 operates to transfer the base electrode of transistor Q2 from the battery on lead LO to the battery of lead SB through the make portion of transfer contact 1 of relay TR1. Holding ground for relay LO1 is transferred from lead M1 directly to ground through transistor Q2 by the operation of transfer contact 5 of relay LO1. Contact 3 of relay LO1 breaks the initial operating path of relay TR1; however, relay TR1 is maintained energized via the path previously traced over leads M1 and P1. Operation of transfer contact 4 of relay LO1 transfers lead SG1 from the base electrode of transistor Q1 to the base electrode of transistor Q2 through resistor 341, thereby returning transistor Q1 to a nonconducting state and placing transistor Q2 and the above-traced holding path therethrough for relay LO1 under the control of contact K10 to station 101 after relay TR1 releases.

Assume, for the purpose of illustration, that the number selection key at station 101, and thus contact K10, is not released prior to completion of automatic dialing by repertory dialer 450. When dialer 450 completes dialing the last digit of the telephone number for station 101, ground potential is removed from lead G and battery is removed from lead L2. The former extinguishes lamp DL at station 101, and the latter breaks the holding ground path for relay S10. Inasmuch as contact K10 is assumed to be maintained operated, a path can be traced through the winding of relay S10 from source 210 through diode 211, lead SL10, contact K10, lead SG1, the make portion of operated transfer contact 4 of relay LO1, resistor 341 and the base-to-emitter circuit of transistor Q2 to ground. The impedance of resistor 341 limits the current in this path to a level insufficient to maintain relay S10 energized, and therefore relay S10 releases. The current in the above-traced path is, however, sufficient to maintain transistor Q2 in a conducting state to maintain relay LO1 energized.

Release of contact 3 of relay S10 removes source 225 from lead SB, thereby releasing relays B, C and TR1 and returning transistor Q14 to a nonconducting state. Release of transfer contact 1 of relay TR1 restores the connection between lead PF and lead SB through the break portion of transfer contacts 1 of each of relays TR1 through TR*n*. Release of transfer contact 2 of relay TR1 restores ground over lead ML to the base electrode of transistor Q13, returning transistor Q13 to a nonconducting state and releasing relay SG. Break contact 1 of relay SG in station control circuit 301, and similar contacts of relay SG in control circuits 302 through **30*n*, release to restore the connection between stations 102 through 10*n* and transistors Q1 in each of control circuits 302 through 30*n*** via leads SG2 through SG*n*, respectively. Thus the operate paths, for each of relays TR2 through TR*n* are restored, giving stations 102 through **10*n* access to dialer 450. Station 101 is locked out inasmuch as the operate path for relay TR1 is still broken by operated break contact 3 of relay LO1 and by the break portion of operated transfer contact 4** of relay LO1.

Transfer contacts 3 and 4 of relay TR1 release to transfer the connection of leads TT1 and TR1 from subscriber station 101 back to tip and ring conductors T1 and R1 to the central office. Repertory dialer is thus released, the system is restored to its initial condition with respect to stations 102 through **10*n* ready to serve a call from any one of these stations. Transistor Q2 is maintained in a conducting state and relay LO1 is maintained operated to lock out station 101 from access to dialer 450 until contact K10 is released. When contact K10 at station 101 is released, source 210** is removed from lead SG1 and thus from the base of transistor Q2, returning transistor Q2 to a nonconducting state and releasing relay LO1.

In normal operation, however, the number selection key at station 101, and thus contact K10 actuated thereby, will be released prior to completion of automatic dialing by dialer 450. When contact K10 releases during operation of dialer 450, relay S10 is maintained operated under control of dialer 450 via the path traced above over leads SA and G. Source 210 is removed from lead SG1 leaving transistor Q2 and relay LO1 under control of dialer 450 via lead SB through operated make contact 3 of relay S10 to source 225. Relay TR1 is also maintained energized under control of contact 3 of relay S10 via the path traced above over leads 350 and P1 to lead SB. When dialer 450 completes dialing operation, lamp DL at station 101 is extinguished in the manner described above and ground potential is removed from lead G, releasing relay S10. Release of contact 3 of relay S10 removes source 225 from lead SB, releasing relays B, C, TR1 and LO1, restoring the system to its initial condition ready for serving another call. Capacitor 342 connected between the collector and base electrodes of transistor Q2 provides a slow release characteristic to relay LO1, thereby preventing station 101 from re-seizing dialer 450 before it can be seized by a waiting one of stations 102 through **10*n***.

Although it is assumed in the above description that the selected memory location is located in the first information channel of dailer 450, it will be apparent that the operation of the system is substantially the same if the memory location is in the second channel. For example, if the number selection key at station 101 which actuates contact K34 is depressed (contact K34 corresponding to a memory location in the second channel of dialer 450), selecting relay S10 is energized in the same manner as when contact K10 was operated in the above description. The path from contact K34 to the winding of relay S10 and source 210 is traced along lead SL34, rather than lead SL10. Thus no ground signal is extended over lead SP to point 436, as it was when contact K10 was operated above. Accordingly, when contact 3 of relay S10 operates, source 225 is connected therethrough on lead SB and over lead SB1 through resistor 438 to point 436. Breakdown diode 437 breaks down to connect point 436 to the base electrode of transistor Q16, placing transistor Q16 in a conducting state to complete a path from source 445 through break contact 6 of relay C, the break portion of transfer contact 2 of relay SC, the winding of relay SC and transistor Q16 to ground. Relay SC is energized in this path, make contact 1 thereof preparing a ground holding path which is completed when contact 5 of relay C operates subsequently. Transfer contact 2 of relay SC transfers holding battery for relay SC to lead SB over lead SB1. An indication that the selected memory location is in the second information channel is extended to dialer 450 over lead RL by the operation of make contact 3 of relay SC.

The operation of the system continues in the same manner as described above, dialer 450 energizing the transducer circuitry adjacent the second channel in response to the ground on lead RL. When the operation of dialer 450 is completed and relay S10 is released, removing source 225 from lead SB, relay SC is released.

Subscriber station 101, in the illustrative embodiment herein, is provided with record key 6 for changing the individual telephone numbers stored in the dialer. Assume, for example, that station 101 wishes to change the telephone number stored in the memory location in dialer 450 corresponding to the number selection key at station 101 which actuates contact K10. Station 101 need not go off-hook to store a number in repertory dialer 450. All that need be done at station 101 is to depress momentarily the particular number selection key actuating contact K10 and, also, record key 6, and then to dial the number to be stored while maintaining record key 6 depressed.

When record key 6 is depressed, contact CRK is operated to complete a path therethrough from ground over lead CRL through the winding of change repertory relay CR to source 415, energizing relay CR. Record key 6 must be maintained depressed until the recording operation is completed. Make contact 1 of relay CR, in conjunction with the operation of contact K10, completes a path for energizing selecting relay S10. This path is the same as the path traced for energizing relay S10 for dialing operation, except that the ground path from the emitter electrode of transistor Q1 is traced through operated make contact 1 of relay CR instead of through switchhook contact SH3. Completion of this path also places transistor Q1 in a conducting state to complete the operating path for relay TR. Again, the path for operating relay TR is the same as the path traced for dialing operation except that the ground path is traced through operated make contact 1 of relay CR.

Operation of relays S10 and TR1, and subsequently relays B, C and LO1, during recording operation is substantially the same as that described therefor during dialing operation. Relay TR1 functions to lock out stations 102 through **10*n* during the recording operation. Make contact 2 of relay B extends ground on lead ST to initiate rotation of the drum in dialer 450, which stops at the memory location indicated by marked lead C10 corresponding to the number selection key actuating contact K10 at station 101. When the transducer circuitry and the selected memory location in dialer 450 are situated adjacent each other, battery is extended by dialer 450 over lead L3 through the make portion of transfer contact 2 of relay CR, through operated make contact 1 of relay C, over lead LP, through operated make contact 5 of relay TR1, over lead LL1 to light lamp DL. Contact K10 may be released at station 101 and the number which is to be stored may be dialed via dialing mechanism 4 for transmission over bus RB to dialer 450. The magnetic transducer circuitry adjacent the selected memory location is conditioned by source 465 connected to lead CR1 through the make portion of operated transfer contact 5 of relay CR to record the number received on bus RB. Break contacts 3 and 4** of relay CR operate to disconnect leads TTR1 and TRR1 from leads TTR and TRR, respectively.

It is to be understood that the above-described arrangements are but illustrative of the application of the principles of applicant's invention. Numerous other arrangements may be devised by those skilled in the art without departing from the spirit and scope of the invention.

What is claimed is:

1. An arrangement for concentrating a plurality of subscriber stations into a common repertory dialer comprising pluralities of selection switches associated with each of said stations and individually corresponding to a particular telephone number stored in said repertory dialer, means responsive to the operation of one of said selection switches at one of said stations for marking said one station and for operating said dialer to generate a telephone number corresponding to said operated selection switch, means responsive to the marking of one of said stations and operative during the operation of said dialer for preventing seizure of said dialer by the other ones of said stations, and means operative upon initiation of operation of said dialer for removing said dialer from control of said marked station until completed operation of said dialer and until release of said operated selection switch at said marked station.

2. An arrangement for concentrating a plurality of subscriber stations into a common repertory dialer comprising pluralities of manually operable selection switches associated with each of said stations, each of said switches corresponding to a particular telephone number in said repertory dialer, means responsive to the operation of one of said selection switches at one of said stations for marking said one station and for seizing said dialer, said dialer operative upon seizure to generate a telephone number corresponding to said operated selection switch and thereupon to release, means responsive to the marking of one of said stations for preventing seizure of said dialer by the other ones of said stations, means responsive to initiation of operation of said dialer for releasing said dialer from control of said selection switches associated with said marked station, and means responsive to said releasing means and to continued operation of said one selection switch for locking out said marked station upon release of said dialer.

3. In an arrangement for concentrating a plurality of subscribed stations into a common repertory dialer having a plurality of storage locations for individually storing respective telephone numbers, the combination comprising pluralities of selection switches associated with each of said stations and individually corresponding to respective ones of said storage locations in said dialer, means responsive to the operation of one of said selection switches at one of said stations for marking said one station and for seizing said dialer, means for directing said dialer to the respective storage location individually corresponding to said operated selection switch, and means operative upon completed operation of said dialer for releasing said dialer from said marked station irrespective of the continued operation of said one selection switch at said marked station.

4. In an arrangement in accordance with claim 3, the combination further comprising means associated with at least one of said stations for storing telephone numbers in the individual storage locations in said dialer corresponding to said selection switches associated with said one station.

5. In an arrangement for concentrating a plurality of subscribed stations into a common repertory dialer having a plurality of storage locations for individually storing the respective telephone numbers, the combination comprising pluralities of selection switches associated with each of said stations and individually corresponding to respective ones of said storage locations in said dialer, first means responsive to the operation of one of said selection switches at one of said stations for marking said one station and for seizing said dialer, second means responsive to the operation of one of said selection switches at one of said stations for directing said dialer to the particular storage location therein corresponding to said operated selection switch, a record key and means for providing telephone numbers to said dialer associated with at least one of said stations, means responsive to the operation of said record key for energizing storage circuitry in said dialer to store a telephone number provided thereto in said particular storage location corresponding to said operated selection switch, means operative in the absence of operation of said record key for energizing circuitry in said dialer to read out the telephone number stored in said particular storage location, and means operative upon completed operation of said dialer to lock out said marked station until said operated selection switch is released and to permit seizure of said dialer by the other of said stations.

6. In combination, a telephone repertory dialer having a plurality of register locations for individually registering respective telephone numbers and having output means operable for selectively pulsing out said respective telephone numbers, a plurality of subscriber stations each having a plurality of manually operable selection switches individually associated with corresponding ones of said plurality of register locations, means responsive to the operation of one of said selection switches at one of said subscriber stations for seizing said repertory dialer and for operating said output means to pulse out the telephone number registered in said register location associated with said one selection switch, means for preventing concurrent seizure of said repertory dialer by two or more said subscribed stations, and means operative upon completed operation of said output means for releasing said repertory dialer regardless of the continued operation of said one selection switch.

7. In combination with a telephone repertory dialer having a plurality of register locations for individually registering respective telephone numbers and having output means operable for selectively pulsing out said respective telephone numbers, a plurality of subscriber stations each having a plurality of manually operable selection switches individual associated with corresponding ones of said plurality of register locations, means responsive to the operation of one of said selection switches at one of said subscriber stations for seizing said repertory dialer and for operating said output means to pulse out the telephone number registered in said register location associated with said one selection switch, a record switch and means for providing telephone numbers to said dialer associated with at least one of said stations, means responsive to the concurrent operation of said record switch and one of said selection switches for seizing said dialer and for registering a telephone number provided thereto in said register location associated with said one selection switch, and means operative incident to the seizure of said dialer by one of said stations for locking out the other of said stations and operative upon completed operation of said dialer to lock out said one station until said operated selection switch is released.

8. An arrangement for concentrating a plurality of subscriber station into a common telephone repertory dialer on a shared-use basis comprising pluralities of manually operable selection switches associated with each of said stations, each of said selection switches corresponding to a particular telephone number in the repertory of said dialer, first lockout means individually associated with each of said stations and operable for preventing said individual station from seizing said dialer, second lockout means individually associated with each of said stations and operable for preventing said individual station from seizing said dialer, means responsive to the operation of one of said selection switches at one of said stations for marking said one station and for seizing said dialer, said dialer operative upon seizure to generate a telephone number corresponding to said operated selection switch and thereupon to release, means responsive to seizure of said dialer by one of said stations for operating said first lockout means associated with each of the other of said stations, means operative upon seizure of said dialer for operating said second lockout means associated with said one marked station, means operative upon release of said dialer for releasing said first lockout means before release of said second lockout means, and means operative upon release of said dialer responsive to continued operation of said one selection switch for maintaining said second lockout means associated with said one marked station operated.

9. An arrangement for concentrating a plurality of subscriber stations into a common repertory dialer comprising pluralities of selection switches associated with each of said stations and individually corresponding to a particular telephone number in said repertory dialer, means responsive to the operation of one of said selection switches at one of said stations for marking said one station and for operating said dialer to generate a telephone number corresponding to said operated selection switch, means responsive to the marking of one of said stations and operative during the operation of said dialer for preventing seizure of said dialer by the other ones of said stations, means operative upon initiation of operation of said dialer for removing said dialer from control of said selection switches associated with said marked station, and means for maintaining said removing means operated for at least a predetermined interval of time after completed operation of said dialer for said marked station, thereby providing preferential access to said dialer during said interval of time by the other of said stations.

10. An arrangement in accordance with claim 9 further comprising means for maintaining said removing means operated upon completed operation of said dialer for said marked station until said operated selection switch at said marked station is released.

References Cited

UNITED STATES PATENTS

| | | | |
|---|---|---|---|
| 2,883,472 | 4/1959 | Stehlik | 170—18 X |
| 3,105,878 | 10/1963 | Frankel et al. | 179—90.2 X |
| 3,115,551 | 12/1963 | Plyer | 179—18 |
| 3,234,336 | 2/1966 | Wells | 179—90.2 |

KATHLEEN H. CLAFFY, *Primary Examiner.*

L. A. WRIGHT, *Assistant Examiner.*